United States Patent [19]

Mahoney et al.

[11] Patent Number: 5,625,141

[45] Date of Patent: Apr. 29, 1997

[54] SEALED PARTS LEAK TESTING METHOD AND APPARATUS FOR HELIUM SPECTROMETER LEAK DETECTION

[75] Inventors: David G. Mahoney, Londonderry, N.H.; Glenn E. Ruiz, Billerica, Mass.; Jack W. Farmer, Sierra Madre, Calif.; Thomas L. Pflanz, Westwood, Mass.; William D. Hall, Deerfield, N.H.; Roy F. Parsons, deceased, late of Dunstable, Mass., by Kathy Parsons, administratrix

[73] Assignee: Varian Associates, Inc., Palo Alto, Calif.

[21] Appl. No.: 84,003

[22] Filed: Jun. 29, 1993

[51] Int. Cl.$^6$ .................................................. G01M 3/20
[52] U.S. Cl. ................................................................ 73/40.7
[58] Field of Search ................................. 73/40.7, 49.3, 73/49.2 R

[56] References Cited

U.S. PATENT DOCUMENTS

| | | | |
|---|---|---|---|
| 3,342,990 | 9/1967 | Barrington et al. | 250/41.9 |
| 3,369,392 | 2/1968 | Christensson | 73/49.2 R |
| 3,520,176 | 7/1970 | Becker | 73/40.7 |
| 3,578,758 | 5/1971 | Altshuler | 73/40.7 |
| 3,626,760 | 12/1971 | Briggs et al. | 73/40.7 |
| 3,690,151 | 9/1972 | Briggs | 73/40.7 |
| 3,729,983 | 5/1973 | Coppens | 73/40.7 |
| 3,824,839 | 7/1974 | Briggs | 73/40.7 |
| 3,855,844 | 12/1974 | Craig | 73/40.7 |
| 4,472,962 | 9/1984 | Mennenga | 73/40.7 |
| 4,499,752 | 2/1985 | Fruzzetti et al. | 73/40.7 |
| 4,510,792 | 4/1985 | Morel et al. | 73/40.7 |
| 4,735,084 | 4/1988 | Fruzzetti | 73/40.7 |
| 4,845,360 | 7/1989 | Landfors | 250/288 |
| 5,029,464 | 7/1991 | Lehmann | 73/49.3 |
| 5,131,263 | 7/1992 | Handke et al. | 73/40.7 |
| 5,170,660 | 12/1992 | Lehmann | 73/52 X |
| 5,185,709 | 2/1993 | Johnson et al. | 73/717 |
| 5,375,456 | 12/1994 | Burns | 73/40.7 |

FOREIGN PATENT DOCUMENTS 121620  12/1918  United Kingdom .................... 73/49.3

OTHER PUBLICATIONS

Lange's Handbook of Chemistry Editor John A. Dean 13th Edition pp. 11–42 (No date).

*Primary Examiner*—Michael Brock
*Attorney, Agent, or Firm*—Bella Fishman

[57] ABSTRACT

Small, hermetically sealed pans are leak tested after subjecting the finished device to an environment of trace gas such as helium. During the testing process the pans may lose their helium charge by rapid escape due to massive gross leaks. These cases demand pre-helium mass spectrometer leak detector gross leak testing procedure. The non-helium expansion technique, used in conjunction with a helium mass spectrometer leak detector, provides a reliable and automatic gross and fine leak testing of the pans by a single apparatus. The test pan is placed in a sealed test fixture, and a valve between the test fixture and an expansion chamber is opened. The pressure in the expansion chamber is measured after the valve is opened. When the measured pressure is less than a reference pressure, a leaking test pan is indicated. When a sealed test pan is indicated, a helium mass spectrometer leak test is performed to determine the presence of fine leaks in the test part.

12 Claims, 4 Drawing Sheets

SEALED PARTS LEAK TESTING METHOD AND APPARATUS FOR HELIUM SPECTROMETER LEAK DETECTION

FIELD OF THE INVENTION

This invention relates to detection of leaks in sealed parts and, more particularly to a helium mass spectrometer leak detector combined with a volume expansion technique for gross leak detection. The volume expansion technique is performed sequentially with helium trace gas leak detection.

BACKGROUND OF THE INVENTION

It is frequently necessary to perform leak testing of small sealed parts. An example is the impact sensor used in the airbag system of an automobile. The impact sensor includes an impact switch that is activated by the deceleration of a collision. The impact switch activates an airbag inflation device. The impact switch is enclosed in a hermetically sealed container to prevent contamination by moisture and other foreign matter. Since proper operation of the impact sensor is critical to the function of the airbag system, a leak test must be performed on the impact sensor to ensure seal integrity. The leak test must be capable of detecting leaks over a wide range of leak rates.

One prior art technique for leak testing small parts, such as impact sensors, involves immersion of the part in a fluid such as a hydrofluorine compound that has a low boiling point. Parts with leaks fill up with the fluid. Then the parts are immersed in a heated fluid which causes the hydrofluorine compound to boil, thereby creating bubbles when there is a leak. A human operator must observe the bubbles in order to detect leaks. The bubble leak detection technique is an extremely slow, unreliable and expensive process. Furthermore, the bubble technique is unable to detect fine leaks.

Another prior art technique for detecting gross leaks involves measurement of the time required for vacuum pumping. A part under test is placed in a test fixture, and the test fixture is vacuum pumped. The time required to reduce the test fixture to a prescribed pressure is measured. When the test part has a gross leak, the time to reach the prescribed pressure increases, thereby indicating a leaky part.

Yet another prior art leak detection technique involves the use of a helium mass spectrometer leak detector. Helium is used as a trace gas which passes through the smallest of leaks in a sealed test part. The helium is the n drawn into a leak detection instrument and is measured. An important component of the instrument is a mass spectrometer tube which detects and measures the helium. The input test sample is ionized and mass analyzed by the spectrometer tube in order to separate the helium component. For testing of small parts, such as an impact sensor, the test part is pressurized with helium and is placed in a sealed test fixture connected to the test port of the leak detector. The helium, which passes through leaks in the test part into the test fixture, is drawn through the test port into the leak detector and is measured by the leak detector. Helium mass spectrometer leak detectors are disclosed, for example, in U.S. Pat. No. 3,690,151 issued Sep. 12, 1972 to Briggs; U.S. Pat. No. 4,499,752 issued Feb. 19, 1985 to Fruzzetti et al and U.S. Pat. No. 4,845,360 issued Jul. 4, 1989 to Landfors.

While helium mass spectrometer leak detectors provide highly satisfactory operation under appropriate circumstances, gross leaks can not be reliably detected in sealed parts such as impact sensors, because the part may have a gross leak, and all helium may have leaked from the test part prior to the time of leak testing. In this case, the helium mass spectrometer leak detector misinterprets a gross leak as no leak because no helium is detected.

It is a general object of the present invention to provide improved leak detection techniques over the prior art.

It is another object of the present invention to provide methods and apparatus for reliably detecting gross leaks as a pre-test to fine leak detection.

It is a further object of the present invention to provide methods and apparatus for detecting leaks over a wide range of leak rates.

It is yet another object of the present invention to provide leak detection methods and apparatus which are fast, easy to use and highly reliable.

SUMMARY OF THE INVENTION

According to the present invention over the prior art, these and other objects and advantages are achieved in methods and apparatus for leak testing of a test part. An apparatus in accordance with the invention comprises a test fixture for sealable enclosure of a test part, an expansion chamber coupled by a gas conduit to the test fixture, an expansion valve coupled in the gas conduit between the test fixture and the expansion chamber, means for evacuating the expansion chamber with the expansion valve closed, means for opening the expansion valve with a test part sealed in the test fixture so that gas in the test fixture expands into the evacuated expansion chamber, the test fixture and the expansion chamber defining a test chamber, means for measuring the pressure in the test chamber after the expansion valve is opened, and means for comparing the measured pressure with a reference value. The reference value corresponds to a test chamber pressure that would be reached only when the test part has a gross leak. A measured pressure equal to or greater than the reference value indicates a leaking test part. The apparatus detects leaks in the test part even when all of a trace gas has escaped from the test part.

The apparatus preferably further includes a trace gas leak detector for performing a trace gas leak test on the test part when the comparison means does not indicate a leaking test part. The trace gas leak detector preferably comprises a helium mass spectrometer leak detector. The trace gas leak test detects fine leaks in the test part.

Preferably, a decision as to the condition of the test part is delayed a predetermined time interval after the expansion valve is opened. By delaying the decision, gas is allowed to escape from the test part into the test fixture through a leak, and the range of leak rates that can be detected by the non-helium expansion technique is increased.

The test fixture preferably has an internal volume surrounding the test part that is very small compared to the test part. Preferably, the internal volume of The expansion chamber is approximately equal to the internal volume of the test fixture surrounding the test part.

The means for evacuating the expansion chamber preferably comprises a roughing pump coupled through a roughing valve to the expansion chamber and means for closing the roughing valve after evacuation of the expansion chamber. The apparatus may further include means for compensating the measured pressure for variations in atmospheric pressure. In a preferred embodiment, the means for measuring the pressure in the test chamber comprises a capacitance manometer coupled to the expansion chamber.

According to another aspect of the invention, the apparatus preferably further includes an atmospheric gross leak valve coupled between the test chamber and the trace gas leak detector. The trace gas leak detector performs a trace gas leak test after the expansion valve is opened. The atmospheric gross leak valve preferably comprises an orifice selected to permit operation of the trace gas leak detector at or near atmospheric pressure. The atmospheric gross leak test detects gross leaks in situations where at least some trace gas remains in the test part at the time of test.

BRIEF DESCRIPTION OF THE DRAWINGS

For a better understanding of the present invention, together with other and further objects, advantages and capabilities thereof, reference is made to the accompanying drawings, which are incorporated herein by reference and in which.

DETAILED DESCRIPTION OF THE INVENTION

Figure 1:
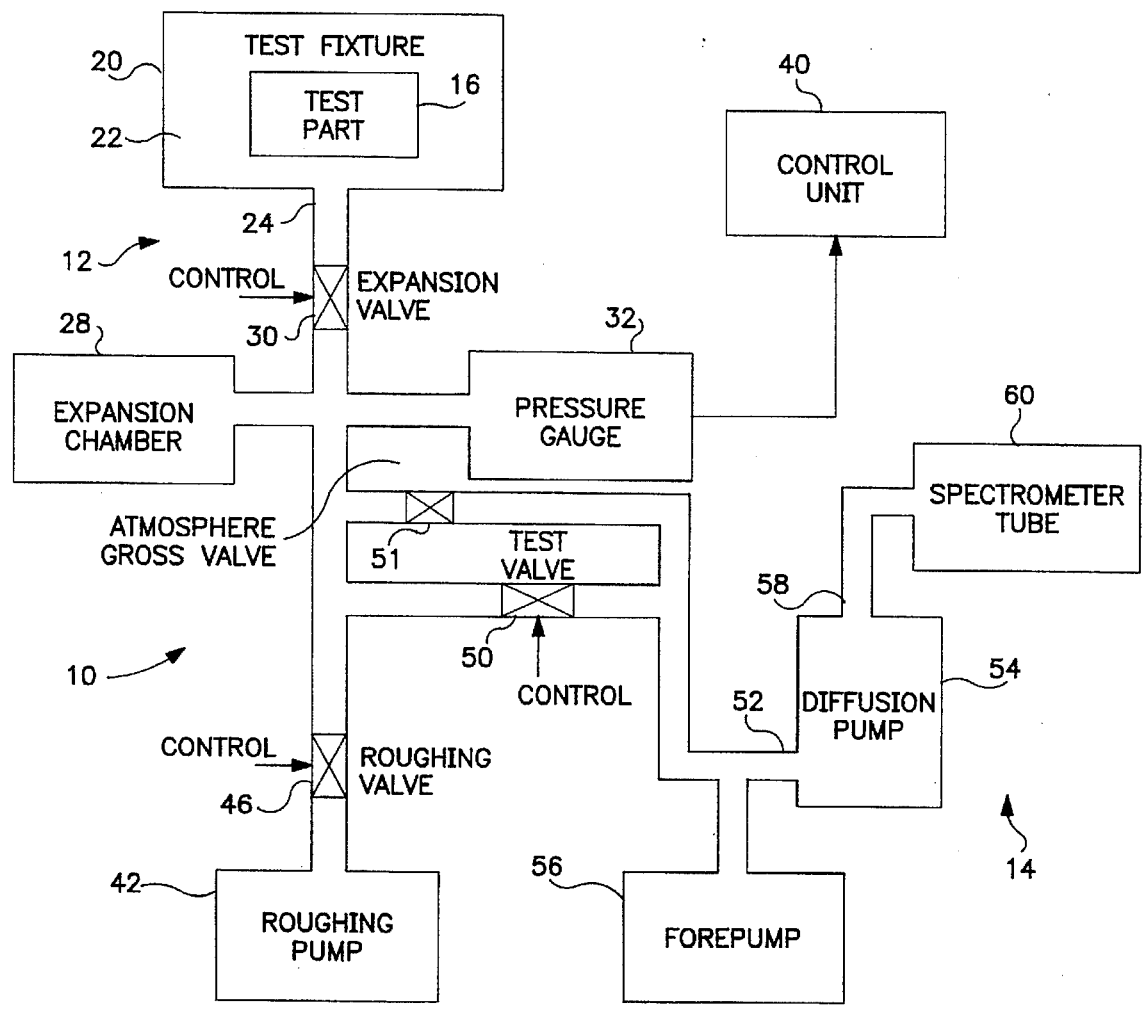
FIG. 1 is a schematic block diagram of a leak detection system in accordance with the present invention.

A simplified block diagram of a preferred embodiment of the present invention is shown in FIG. 1. A leak test system 10 includes a non-helium expansion leak detector 12 and a helium mass spectrometer leak detector 14. The leak test system 10 performs leak testing of a sealed test part 16 such as an impact sensor for an automobile, a cardiac pacemaker, a high voltage fuse, a sealed semiconductor package, or the like.

The test part 16 is hermetically sealed according to the normal manufacturing procedure for that part, with helium enclosed in its interior. Helium serves as a trace gas for leak detection as described below. While other trace gases can be utilized, helium is the most commonly used trace gas.

As noted above, the test part 16 may have a leak that is so large that all helium leaks out of the test part prior to testing by the helium mass spectrometer leak detector 14. In this case, the helium mass spectrometer leak detector 14 would detect no helium and would indicate a sealed test part. To overcome this problem, the non-helium expansion leak detector 12 is used first and identifies those test parts which have a gross leak and which would otherwise be erroneously indicated as sealed by the helium mass spectrometer leak detector 14.

If the non-helium expansion leak detector 12 detects a leak in the test part 16, the test part is discarded or repaired, and no further testing is performed. If the non-helium expansion leak detector 12 does not detect a leak in the test part, further testing is performed by the helium mass spectrometer leak detector 14. The helium mass spectrometer leak detector 14 can detect fine leaks which would not be detected by the non-helium expansion leak detector 12. Thus, the leak test system 10 reliably detects leaks in the test part 16 over a very wide range of leak rates.

The leak test system 10 includes a sealable test fixture 20 for mounting of test part 16. The test fixture 20 is preferably designed to have an internal volume 22 surrounding the test part 16 that is relatively small fine compared to the test part. That is, the total internal volume 22 of the test fixture 20 is preferably not substantially greater than the volume occupied by the test part 16. In some cases, several test parts may be placed in the test fixture and tested simultaneously. In one example, the test fixture 20 was designed to accommodate 12 impact sensors. The net volume of the test fixture and the test port conduit up to the expansion valve 30 less the volume of the 12 test parts was about 5.5 cubic inches. The test part 16 is typically mounted in test fixture 20 at atmospheric pressure, and the test fixture 20 is sealed for leak testing as described below.

Figure 4:
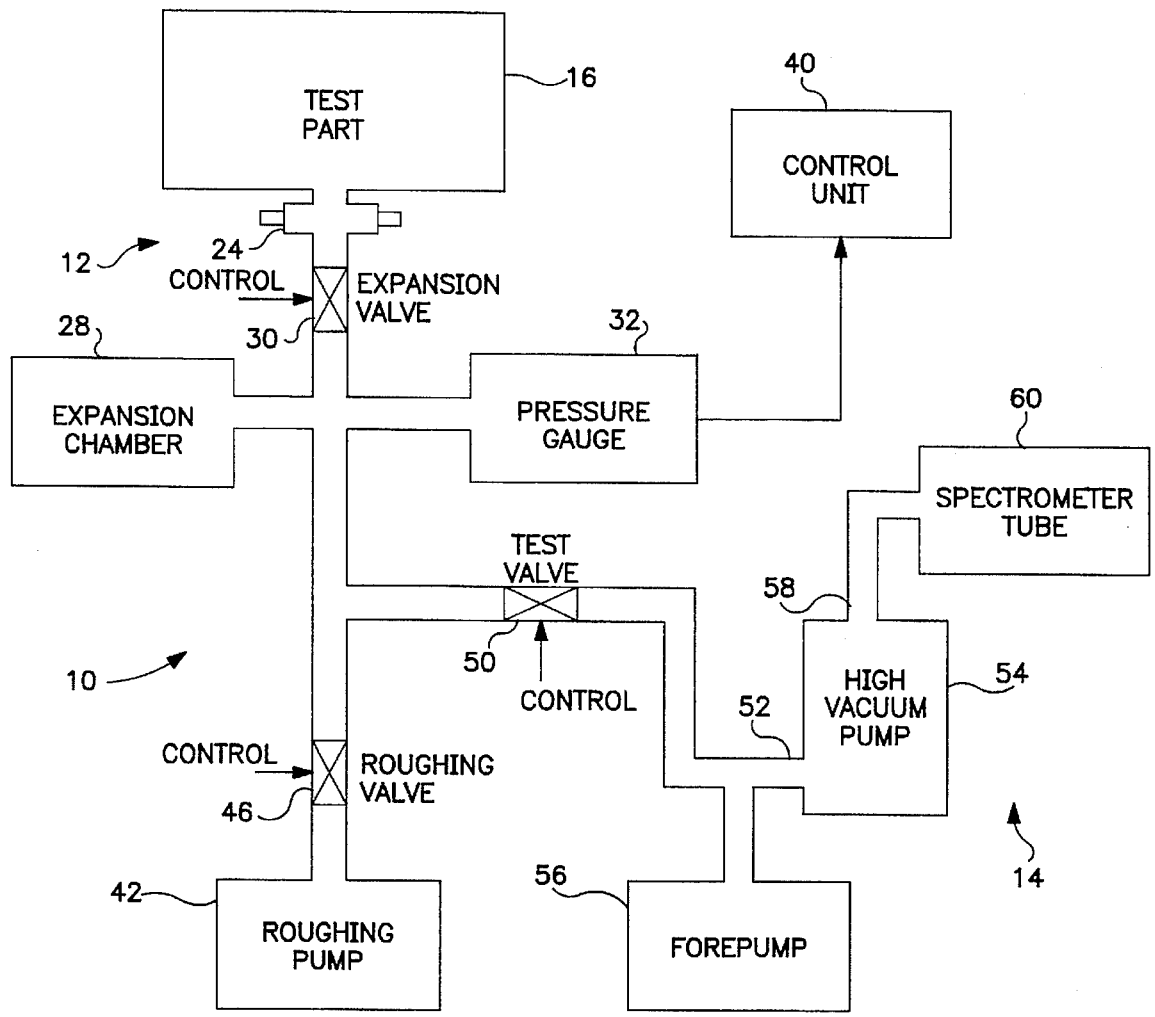
FIG. 4 is a schematic block diagram of a leak detection system in accordance with another preferred embodiment of the present invention.

The test fixture 20 is connected to a test port 24 of the leak detection system. An interior of test part 16 can be attached directly to test part 24 as shown in FIG. 4. The test port is coupled through an expansion valve 30 to an expansion chamber 28. A pressure gauge 32 is connected to expansion chamber 28. An output of pressure gauge 32 is electrically connected to a control unit 40. The control unit 40 controls operation of the leak test system 10.. A roughing pump 42 is connected through a roughing valve 46 to expansion chamber 28.

The test fixture 20 in FIG. 1 is also coupled through expansion valve 30 and a test valve 50 to the foreline 52 of a diffusion pump 54. The foreline 52 is coupled to a forepump 56, which maintains the required operating pressure at the foreline 52. The inlet 58 of the diffusion pump 54 is coupled to the inlet of a mass spectrometer tube Gas connections between elements in the leak test system 10 are made by suitable vacuum-tight gas conduits and fittings, as known in the art. It will be understood that the interconnecting conduits are not limited to the configuration shown in FIG. 1 and FIG. 4. Any connection configuration that permits operation as described below is included within the scope of the present invention.

The non-helium expansion leak detector 12 includes expansion valve 30, expansion chamber 28, pressure gauge 32, test fixture 20, roughing valve 46, roughing pump 42, and the associated interconnections. The helium mass spectrometer leak detector 14 includes test fixture 20, roughing valve 46, roughing pump 42, test valve 50, diffusion pump 54, forepump 56 and mass spectrometer tube 60. It can be seen that the test fixture 20, the roughing valve 46 and the roughing pump 42 are common elements of the non-helium expansion leak detector 12 and the helium mass spectrometer leak detector 14. The control unit 40 controls operation of the leak test system 10.

It will be understood that other configurations of the helium mass spectrometer leak detector are included within the scope of the present invention. For example, the diffusion pump 54 can be replaced with a turbomolecular pump, as known in the art. Furthermore, the "counterflow" leak detector configuration shown in FIG. 1, wherein the helium diffuses in a reverse direction through diffusion pump 54, is not required. A conventional helium mass spectrometer leak detector as disclosed, for example, in U.S. Pat. No. 4,499,752, can be utilized. More generally, any suitable trace gas leak detector can be utilized with the non-helium expansion leak detector.

Operation of the non-helium expansion leak detector 12 is as follows. All operations of the non-helium expansion leak detector 12 are performed with The test valve 50 closed, so that the helium mass spectrometer leak detector 14 is inoperative, or is receiving a test sample through an atmospheric gross leak valve 51, as discussed below. A test part 16 is placed in test fixture 20 at atmospheric pressure, and the test fixture 20 is sealed. The test part 16 is manufactured with helium sealed in its interior. When the test part is hermetically sealed, the helium remains in its interior. In the case of a fine leak, the helium slowly leaks from the test part 16. In the case of a gross leak, all helium may have leaked from the test part prior to the leak test.

Figure 2:
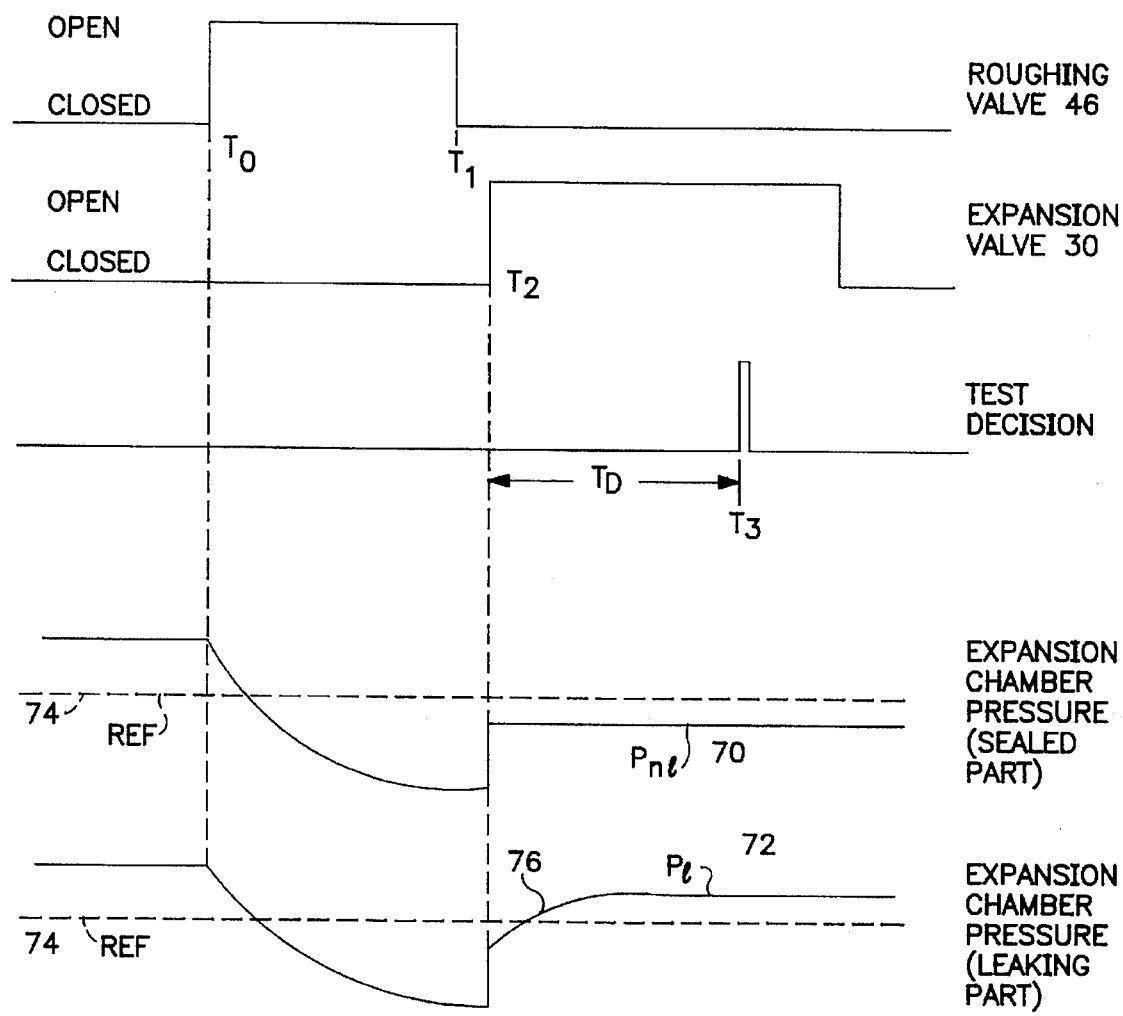
FIG. 2 is a timing diagram which illustrates operation of the leak detection system shown in FIG. 1.

The timing diagram of FIG. 2 illustrates operation of the non-helium expansion leak detector. At the beginning of the test, the test part 16 is placed in the test fixture 20 with the expansion valve 30 closed, and the test fixture 20 is sealed. The roughing valve 46 is opened at time $T_0$, and the expansion chamber 28 is evacuated by roughing pump 42. A curve 70 in FIG. 2 represents the pressure in expansion chamber 28 as measured by pressure gauge 32 for the case of a sealed test part. A curve 72 represents the pressure of expansion chamber 28 as measured by pressure gauge 32 for the case of a leaking test part. As indicated by curves 70 and 72, the pressure in expansion chamber 28 is decreased by roughing pump 42 when roughing valve 46 is open. At time $T_1$, roughing valve 46 is closed, and then expansion valve 30 is opened at time $T^2$. The final pressure in expansion chamber 28 prior to opening of expansion valve 30 is preferably on the order of about 10 millitorr or less.

When the expansion valve 30 is opened at time $T_2$, the gas that was sealed in test fixture 20 rapidly expands into the expansion chamber 28, thereby causing a rapid increase in pressure in expansion chamber 28, as indicated by curves 70 and 72 in FIG. 2. The final equilibrium pressure in expansion chamber 28 depends, in part, on whether the test part 16 has a leak. Thus, by measuring the pressure in expansion chamber 28 after the expansion valve 30 is opened and the gas in test fixture 20 expands into expansion chamber 28, the presence of a leak in test part 16 can be determined. When the test part 16 does not have a gross leak, the pressure in expansion chamber 28 stabilizes at a pressure $P_{n1}$, as indicated by curve 70. When the test part 16 has a gross leak, the expansion chamber 28 stabilizes at a pressure $P_1$, as indicated by curve 72. When the test part 16 has a fine leak, the effect of the leak on the pressure in expansion chamber 28 is such that pressure in expansion chamber 28 is lower than the reference pressure 74. In this case, the expansion chamber 28 stabilizes at pressure $P_{n1}$, and further testing is performed by the helium mass spectrometer leak detector 14 to differentiate between sealed parts and parts with fine leaks.

The presence of a leak in test part 16 is determined by the control unit 40 in response to a measurement of pressure in expansion chamber 28 by pressure gauge 32. As shown in FIG. 2, a reference pressure 74 is established between the pressure $P_1$ indicative of a leaking part and the pressure $P_{n1}$ indicative of a sealed part. In a preferred embodiment, the reference pressure 74 is midway between pressure $P_1$ and pressure $P_{n1}$. Typically, the pressure gauge 32 produces a voltage representative of the pressure in expansion chamber 28. After the expansion valve 30 is opened, the control unit 40 compares the voltage from the pressure sensor 32 with a reference voltage that corresponds to the reference pressure 74. When the measured pressure is lower than the reference pressure 74, as indicated by curve 70, a sealed part is indicated by the control unit 40. Since the non-helium expansion leak detector 12 is not capable of detecting fine leaks in the test part 16, a further test is performed by the helium mass spectrometer leak detector 14 to determine if the part has a fine leak. When the measured pressure in expansion chamber 28 is greater than the reference pressure 74, as indicated by curve 72, a leaking test part is indicated by control unit 40. In this case, the test part 16 is discarded or repaired. The pressure $P_{n1}$ in expansion chamber 20 for the case of a sealed test part is determined from Boyle's Law as follows:

$$P_{n1}=P_a V_f/(V_f+V_e) \tag{1}$$

where $P_a$ represents atmospheric pressure, $V_f$ represents the net internal volume of test fixture 20 surrounding test part 16, and $V_e$ represents the volume of expansion chamber 28. The pressure $P_1$ in expansion chamber 28 for the case of a leaking test part 16 is given by:

$$P_1=P_a(V_f+V_p)/(V_f+V_e+V_p) \tag{2}$$

where $V_p$ presents the internal volume of the test part 16.

Referring again to FIG. 2, it can be seen that in the case of a leaking test part the pressure in expansion chamber 28 increases according to a transient waveform 76 after the expansion valve 30 is opened at time $T_2$. The transient waveform 76 is caused by leakage of gas from the test part 16. When the leak is gross, the pressure increases rapidly during transient waveform 76. By contrast, when the leak is fine, the pressure increases slowly during transient waveform 76. Thus, if a decision as to whether the test part is sealed or leaking is made a short time after expansion valve 30 is closed, the pressure in expansion chamber 28 may not have stabilized and may be less than the reference pressure 74, even though the part is leaking and the pressure will ultimately stabilize at pressure $P_1$. In this situation, an erroneous decision as to the condition of the test part may be made. To prevent such erroneous decisions by the non-helium expansion leak detector 12, the test decision is made at time $T_3$, a predetermined delay $T_D$ after expansion valve is opened The delay $T^D$ ensures that parts having leaks greater than a prescribed minimum leak rate will be indicated as leaking by the non-helium expansion leak detector 12. In a preferred embodiment, the delay $T_D$ is in a range of about 1.5 to 2.5 seconds. However, other delays $T_D$ can be used within the scope of the present invention. The selection of the delay $T_D$ is a tradeoff between lengthening the delay $T_D$ to detect relatively slow leaks and shortening the delay $T_D$ to prevent unacceptable lengthening of the test cycle.

The comparison of the voltage from the pressure gauge produced by the pressure in expansion chamber 28 with the reference voltage at a predetermined time $T_3$ after opening of the expansion valve 30 can be performed by a variety of circuits well known to those skilled in the art. In a preferred embodiment, the control unit 40 includes a microprocessor, such as a type 8080 or 8088, which performs this function under software control. The control unit 40 opens the expansion valve at time $T_2$ and compares the output of the pressure gauge 32 with the reference voltage after the predetermined delay $T_D$. The result of the comparison is an indication of whether the test part is a massive leaking part or not. When the non-helium leak detector 12 indicates it is not a massive leaking part, a further test is performed by the helium mass spectrometer leak detector 14.

When a test is performed by the helium mass spectrometer leak detector 14, the roughing pump 42 initially evacuates the test port 24 and the test fixture 20 to a pressure in the range of about 10 millitorr. The test valve 50 is then opened, and a test sample containing any helium leaking from the test part 16 is drawn through the test port 24, the expansion valve 30 and the test valve 50 to the foreline 52 of diffusion pump 54. The helium diffuses in a reverse direction through the diffusion pump 54 to the spectrometer tube 60. Since the diffusion pump 54 has a much lower reverse diffusion rate for the heavier gases in the test sample, it blocks those gases from the spectrometer tube 60, thereby efficiently separating the helium for measurement by the mass spectrometer tube 60. The spectrometer tube 60 provides an indication of the quantity of helium in the test sample, and thus an indication of the leak rate of the test part. The helium mass spectrometer leak detector 14 can typically detect leak rates down to $2 \times 10^{-10}$ std cc/sec.

The helium mass spectrometer leak detector 14 shown in FIG. 1 and FIG. 4 is a so-called "counterflow" leak detector, because the helium diffuses in a reverse direction through the diffusion pump 54. A suitable helium mass spectrometer leak detector is a Model 947 manufactured and sold by Varian Associates, Inc. As noted above, other trace gas leak detectors are well known to those skilled in the art and can be utilized in the leak test system shown in FIG. 1. Thus, for example, leak detectors with turbomolecular high vacuum pumps and conventional, or direct flow, leak detectors can be utilized within the scope of the present invention.

The pressure gauge 32 is preferably a differential capacitance manometer, such as a type 222 from MKS. The capacitance manometer has the advantage that it measures the difference between atmospheric pressure and the pressure in the expansion chamber 28 storing this information in the control unit. Atmospheric pressure is a factor in the measurement, because gas is sealed in the test fixture 20 at atmospheric pressure, thereby causing variations in the pressure measured in expansion chamber 28 after expansion valve 30 is opened. It will be understood that other types of pressure gauges can be utilized within the scope of the present invention.

In a preferred embodiment, the control unit 40 constantly compensates for atmospheric pressure variations. Measurements of atmospheric pressure are supplied by pressure gauge 32 to control unit 40 at regular or irregular intervals (such as 50 millisecond intervals) when a leak test is not being performed. The measured atmospheric pressure is subsequently used during a leak test to differentiate between leaking and sealed test parts as described above in connection with equations (1) and (2). When the pressure gauge 32 is a differential capacitance manometer, atmospheric pressure is measured by evacuating expansion chamber 28 to a low pressure with roughing pump 42 so that the measured differential pressure closely approximates atmospheric pressure. Alternatively, the pressure gauge 32 can be implemented as two absolute capacitance manometers, one for measuring the pressure in expansion chamber 28 and one for measuring atmospheric pressure.

It will be understood that the leaking part pressure $P_1$ and the sealed part pressure $P_{n1}$ in expansion chamber 28 will differ for different test fixtures and different test parts, depending on the volume of the test part 16 and the volume of the test fixture 20. Thus, it is necessary to select different reference pressures 74 for different test parts and different test fixtures. Preferably, the reference pressure 74 is determined in a calibration procedure. A known sealed test part is placed in the test fixture 20, and the pressure in expansion chamber 28 is measured after opening expansion valve 30, thereby providing the pressure $P_{n1}$. Then, a known leaking test part is placed in the test fixture 20, and the pressure in expansion chamber 28 is measured after expansion valve 30 is opened, thereby providing the pressure $P_1$. The reference pressure 74 is preferably set midway between the measured pressures $P_{n1}$ and $P_1$.

The non-helium expansion leak detector 12 is capable of leak testing parts with high reliability. In one example, for a part of 0.4 cubic inch, the probability of accepting a leaking part as a sealed part is about 1 in $10^{12}$.

Figure 3:
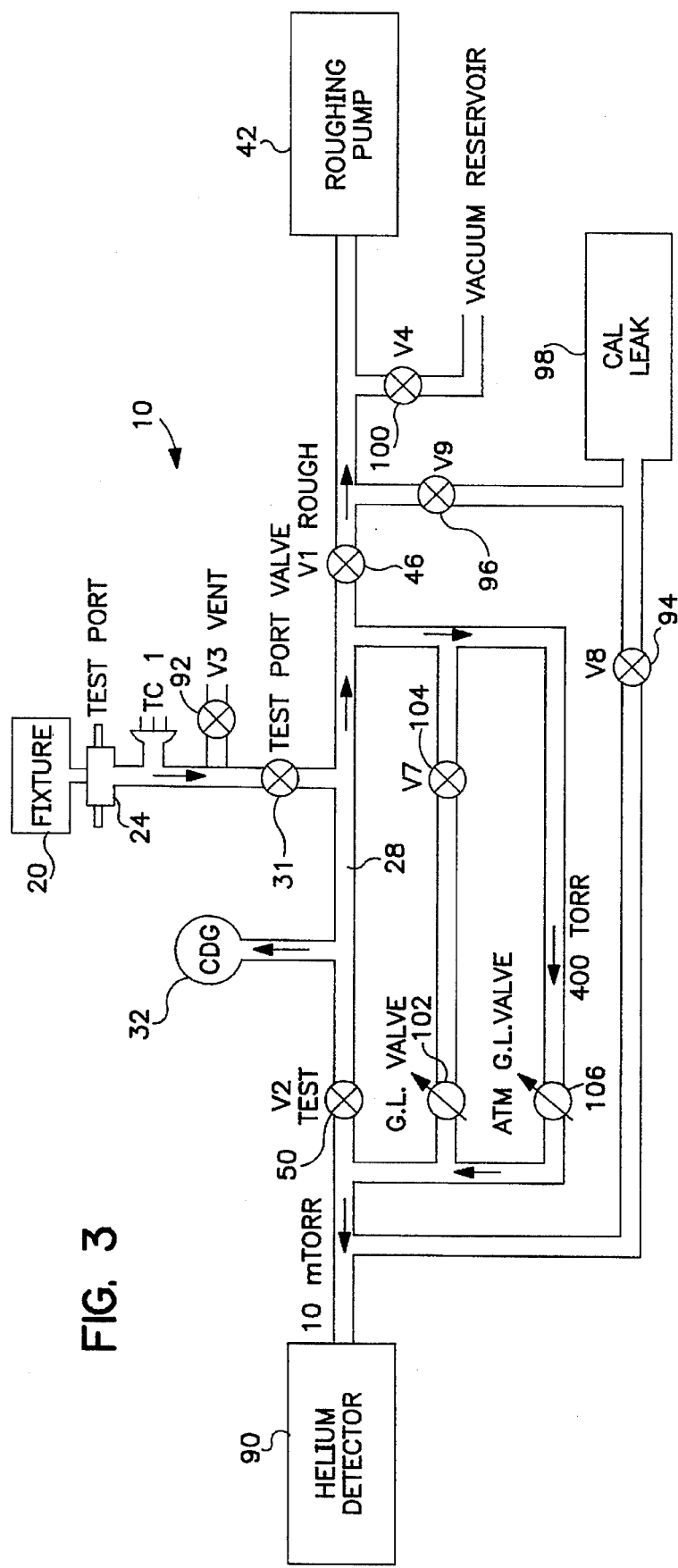
FIG. 3 is a schematic block diagram of a preferred embodiment of the present invention.

A preferred embodiment of the leak test system 10 is shown in FIG. 3. This system is capable of performing a non-helium expansion leak test as described above, an atmospheric gross leak test, a normal gross leak test and a fine leak test. Like elements in FIGS. 1 and 3 have the same reference numerals. A helium detector 90 includes forepump 56, diffusion pump 54 and spectrometer tube 60 as shown in FIG. 1 and FIG. 4. A vent valve 92 connected to the test port 24 is used for venting the test port after completion of a leak test. Valves 94 and 96 and a calibrated leak 98 are used for calibrating and testing of the system in the fine leak test mode. In a preferred embodiment, valves 46 and 50 are vacuum operated, and the remaining valves are solenoid operated. A valve 100 connected between roughing pump 42 and a vacuum reservoir are used in connection with operation of the vacuum operated valves 46 and 50.

In the system of FIG. 3, the expansion chamber 28 is implemented as the internal volume of a valve block (not shown) in which several of the vacuum valves are mounted, rather than as a separate component. However, it will be understood that the system of FIG. 3 effectively employs an expansion volume as shown in FIG. 1 and described above.

A gross leak needle valve 102 and a valve 104 are connected in parallel with the test valve 50. The needle valve 102 typically has an orifice on the order of about 0.055 inch and permits helium testing at pressures up to about 700 millitorr. The gross leak valve 102 permits detection of intermediate leak rates that is, leak rates smaller than those which can be detected by the non-helium expansion leak test and larger than those which are detected by the fine leak test.

In accordance with another aspect of the present invention, an atmospheric gross leak needle valve 106 is connected in parallel with the test valve 50. The atmospheric gross leak valve 106 has a very small orifice, typically on the order of 0.02 inch. This permits helium testing at pressures of 400 torr up to atmospheric pressure.

The atmospheric gross leak valve 106 provides an additional technique for detecting gross leaks in the test part. This technique relies upon at least some helium remaining in the test part at the time when the non-helium expansion leak test is performed. Thus, when the expansion valve 30 is opened (with valves 50, 46 and 104 closed) and gas from the test fixture 20 rapidly expands into the expansion chamber 28, a sample of that gas is drawn through the atmospheric gross leak valve 106 into the helium detector 90. If the sample contains helium, the helium detector 90 indicates a leaky part. The non-helium expansion leak test and the atmospheric gross leak test are preferably performed simultaneously, but can be performed at different times. If the test part contains no helium because of a massive gross leak, the part passes the atmospheric gross leak test but fails the non-helium expansion leak test. If the test part has a gross leak but still contains some helium, the test part fails both the atmospheric gross leak test and the non-helium expansion leak test. If the part passes both the non-helium expansion leak test and the atmospheric gross leak test, the system performs a gross leak test by opening valve 104 as described above. If the part passes the gross leak test, valve 104 is closed and test valve 50 is opened. Then, the normal helium fine leak test, which is capable of detecting fine leaks, is performed. Thus, the system shown in FIG. 3 provides highly reliable leak testing over a wide range of leak rates.

As noted above, the atmospheric gross leak valve 106 comprises a small diameter orifice for passing a sample of the gas in the expansion chamber 28 to the helium detector 90. Typically, the atmospheric gross leak valve 106 remains open throughout the leak test and does not affect operation in other modes because of its small diameter. The atmospheric gross leak test can be utilized separately or in combination with the non-helium expansion leak test.

An additional application of the non-helium expansion leak test is now described. The configuration shown in FIG. 1, wherein the test part is manufactured with helium sealed inside, is known as "inside out" leak testing. Helium is drawn from the inside of the test part through a leak and is detected. In another leak test method, known as "outside in" testing, the test part interior is attached to the test port of the leak detection system, and helium is sprayed on the exterior of the test part. Helium is drawn through a leak into the interior of the test part and then is drawn into the leak detection system where it is detected. In the event that the connection between the test part interior and the leak detection system is blocked, no helium is received by the leak detection system and the test part is passed, even though it may have a leak.

The non-helium expansion leak test technique described above can be used to detect this condition prior to helium leak testing. When a normal connection exists between the test part and the leak detection system, and the expansion valve 30 is opened, gas is drawn from the test part into the expansion chamber 28. In this case, a relatively high pressure is detected. In the event that the connection between the test part and the leak detection system is blocked, little or no gas is drawn into the expansion chamber 28 when the expansion valve 30 is opened, and a relatively low pressure is measured. By appropriate selection of a reference pressure between the pressure that corresponds to a blockage and the pressure that corresponds to no blockage, the blockage can be detected.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An improved trace gas leak detection apparatus for testing small hermetically sealed parts approximating the size of devices such as impact sensors in which a test fixture for sealable enclosure of the parts is coupled through a test valve to a foreline of a high vacuum pump, the high vacuum pump is coupled to an inlet of a mass spectrometer tube, wherein the improvement comprises:

an expansion chamber coupled by a gas conduit to said test fixture, said test fixture having an internal volume surrounding the test part being approximately equal to an internal volume of said expansion chamber;

an expansion valve connected between said test fixture and said expansion chamber in said gas conduit;

means for evacuating said expansion chamber with said expansion valve closed;

means for opening said expansion valve with said test part sealed in said test fixture so that gas in said test fixture expands into the evacuated expansion chamber, said test fixture and said expansion chamber defining a test chamber;

means for measuring the pressure in said test chamber after said expansion valve is opened;

means for comparing the measured pressure to a reference value indicating said test part leaking; and said mass spectrometer tube being coupled to said test chamber for performing a trace gas leak test when said means for comparing does not indicate said test part is leaking.

2. Apparatus as defined in claim 1 wherein said means for evacuating said expansion chamber comprises a roughing pump coupled through a roughing valve to said expansion chamber and means for closing said roughing valve after evacuation of said expansion chamber.

3. Apparatus as defined in claim 1 further including means for delaying a decision as to said test part a predetermined time interval after said expansion valve is opened.

4. Apparatus as defined in claim 3 wherein said predetermined time interval is in a range of 1.5 to 2.5 seconds.

5. Apparatus as defined in claim 1 wherein said means for measuring the pressure in said test chamber comprises a capacitance manometer coupled to said expansion chamber.

6. Apparatus as defined in claim 1 further including means for compensating the measured pressure for variations in atmospheric pressure.

7. Apparatus as defined in claim 6 wherein said means for compensating the measured pressure for variations in atmospheric pressure comprises means for measuring atmospheric pressure.

8. Apparatus as defined in claim 1 wherein said test fixture has an internal volume defined by walls proximately surrounding said test part.

9. Apparatus as defined in claim 1, further including an atmospheric gross leak valve coupled between said test chamber and said mass spectrometer tube.

10. Apparatus as defined in claim 1 wherein atmospheric gross leak valve comprises an orifice selected to permit operation of said mass spectrometer tube at or near atmospheric pressure.

11. Apparatus for leak testing of a test part, comprising:

a test port for sealable attachment to an interior of the test part;

an expansion chamber coupled by a gas conduit to said test port;

an expansion valve connected between said test port and said expansion chamber in said gas conduit;

means for evacuating said expansion chamber with said expansion valve closed;

means for opening said expansion valve when an interior of a test part is sealed to said test port so that gas in the interior of the test part expands into the evacuated expansion chamber, the interior of said test part and internal of said expansion chamber defining a test chamber;

means for measuring the pressure in said test chamber after said expansion valve is opened; means for comparing the measured pressure with a reference value, a measured pressure equal to or less than the reference value indicating a blockage between the interior of the test part and the expansion chamber; and means for leak testing said test part when the measured pressure does not indicate a blockage between the test part and the expansion chamber.

12. Apparatus for leak testing of a hermetically sealed test part disposed within a test fixture, comprising:

a test port for sealable attachment to said test fixture;

an expansion chamber having an internal volume being approximately equal to an internal volume of said test fixture surrounding said sealed test part, said expansion chamber coupled by a gas conduit to said test port;

an expansion valve connected between said test port and said expansion chamber in said gas conduit;

means for evacuating said expansion chamber with said expansion valve closed;

means for opening said expansion valve when an interior of said test fixture is sealed to said test port so that gas in the interior of the test fixture expands into the evacuated expansion chamber, the interior of said test fixture and an interior of said expansion chamber defining a test chamber;

means for measuring the pressure in said test chamber after said expansion valve is opened;

means for comparing the measured pressure with a reference value, a measured pressure equal to or less than the reference value indicating a blockage between the interior of the test part and the expansion chamber; and means for leak testing said test part when the measured pressure indicates a blockage between the test part and the expansion chamber.

* * * * *